US009894222B2

(12) United States Patent
Yamguchi

(10) Patent No.: US 9,894,222 B2
(45) Date of Patent: Feb. 13, 2018

(54) IMAGE PROCESSING DEVICE, IMAGE PROCESSING METHOD, AND IMAGE FORMING APPARATUS

(71) Applicant: FUJI XEROX CO., LTD., Tokyo (JP)

(72) Inventor: Yuya Yamguchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/348,189

(22) Filed: Nov. 10, 2016

(65) Prior Publication Data

US 2017/0366686 A1 Dec. 21, 2017

(30) Foreign Application Priority Data

Jun. 17, 2016 (JP) .................................. 2016-120599

(51) Int. Cl.
*H04N 1/04* (2006.01)
*H04N 1/00* (2006.01)

(52) U.S. Cl.
CPC ....... *H04N 1/00204* (2013.01); *H04N 1/0044* (2013.01); *H04N 1/0097* (2013.01); *H04N 1/00411* (2013.01); *H04N 1/00442* (2013.01)

(58) Field of Classification Search
CPC .... G06F 3/1285; G06F 3/1258; G06F 3/1257; G06F 3/1237; G06F 17/30; G06F 21/608; G06F 1/24
USPC ..... 358/1.15, 1.13, 1.18, 448, 1.9, 403, 474; 382/305, 302, 307, 312, 317, 321; 399/15, 46
See application file for complete search history.

(56) References Cited

U.S. PATENT DOCUMENTS

| | | | | |
|---|---|---|---|---|
| 7,440,134 B2* | 10/2008 | Natori | .................. | G06F 3/1205 358/1.1 |
| 7,584,242 B2* | 9/2009 | Ebuchi | .................. | G06F 3/1256 345/561 |
| 7,913,168 B2* | 3/2011 | Hoshino | ............... | G06F 17/243 715/273 |
| 8,917,410 B2* | 12/2014 | Nakayama | ............... | B65H 3/44 271/3.14 |
| 9,041,945 B2* | 5/2015 | Sato | .................... | H04N 1/00076 358/1.13 |
| 9,111,197 B2* | 8/2015 | Tachi | .................... | G03G 15/502 |
| 9,477,435 B2* | 10/2016 | Nishiyama | ............ | G06F 3/1285 |
| 9,531,901 B2* | 12/2016 | Hayashi | ............ | H04N 1/00408 |
| 2010/0053212 A1* | 3/2010 | Kang | ............... | H04N 21/23412 345/629 |
| 2010/0149590 A1* | 6/2010 | Nishiyama | ......... | H04N 1/00347 358/1.15 |
| 2011/0055694 A1 | 3/2011 | Matsui | | |
| 2013/0314724 A1* | 11/2013 | Tamura | ................ | H04N 1/3875 358/1.2 |
| 2013/0321837 A1* | 12/2013 | Takai | .................... | G06K 15/005 358/1.13 |

(Continued)

FOREIGN PATENT DOCUMENTS

JP 2011-054061 A 3/2011

*Primary Examiner* — Negussie Worku
(74) *Attorney, Agent, or Firm* — Oliff PLC

(57) ABSTRACT

An image processing device includes a memory and an output unit. The memory stores setting-related information related to a setting generated as a result of a setting process performed by a user for commanding an image forming unit to perform an image forming process. The output unit outputs the stored setting-related information in accordance with an operation performed by the user.

9 Claims, 12 Drawing Sheets

(56) References Cited

U.S. PATENT DOCUMENTS

2014/0293344 A1* 10/2014 Umezawa .......... G03G 15/5016
358/1.15
2015/0062613 A1* 3/2015 Higashi ................ G06K 15/409
358/1.14

* cited by examiner

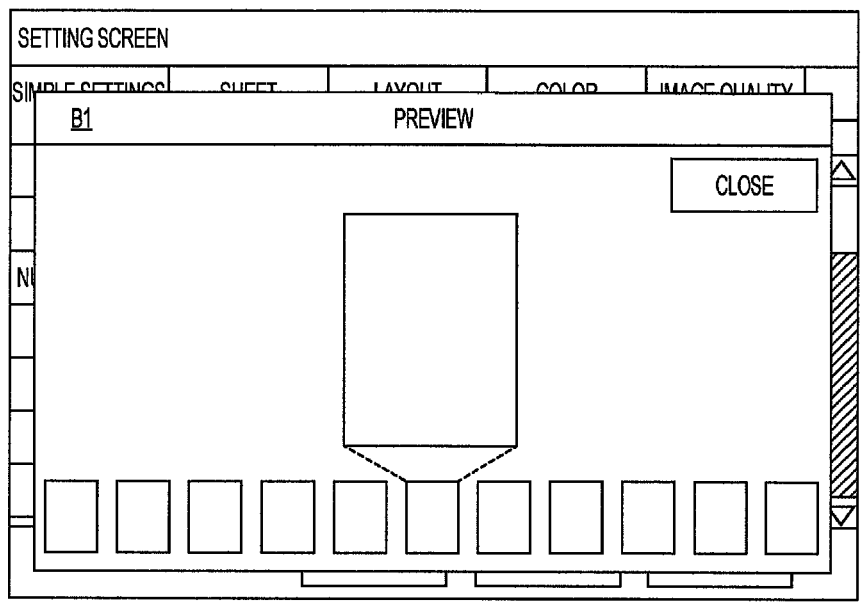

FIG. 7

| COMMAND DATA LIST | | | | | |
|---|---|---|---|---|---|
| HISTORY | PENDING | WAITING TO BE PROCESSED | COMPLETED | ERROR | |
| ID | NAME OF COMMAND DATA | SIZE | INITIATION TIME OF RECEPTION | TIME OF COMPLETION | |
| 001 | ... | . | ××× | ... | |
| 002 | ... | . | ××× ××× | ... | |
| 003 | ... | . | ××× — A4 | ... | |
| 004 | ... | . | ××× DISPLAY SETTING PROCESS HISTORY | ... | |
| 005 | ... | . | COMPARE SETTINGS ← A5 | ... | |
| 006 | ... | ... | ... | ... | |
| | | | OK | CANCEL | |

FIG. 8

| SETTING PROCESS HISTORY | | | | |
|---|---|---|---|---|
| SETTING PROCESS HISTORY OF ID:002 | | | | |
| RECORDED TIME | ID | OPERATING USER | CONTENTS OF SETTING PROCESS | |
| ... | 01 | ... | RIP TYPE CHANGED | |
| ... | 02 | ... | SHEET SIZE CHANGED | |
| ... | 03 | ... | ... CHANGED | |
| ... | 04 | ... | ... CHANGED, ... CHANGED | |
| ... | 05 | ... | PREVIEW DISPLAYED | |
| ... | 06 | ... | ... CHANGED | |
| | | | OK | CANCEL |

FIG. 9

| COMMAND DATA LIST | | | | | |
|---|---|---|---|---|---|
| HISTORY | PENDING | WAITING TO BE PROCESSED | COMPLETED | ERROR | |
| ID | NAME OF COMMAND DATA | SIZE | INITIATION TIME OF RECEPTION | TIME OF COMPLETION | |
| 001 | . . . | . . . | . . . | . . . | |
| 002 | . . . | . . . | . . . | . . . | |
| 003 | . . . | . . . | . . . | . . . | |
| 004 | . . . | . . . | . . . | . . . | |
| 005 | . . . | . . . | . . . | . . . | |
| 006 | . . . | . . . | . . . | . . . | |

A6 — SELECT AS COMPARATIVE TARGET    CANCEL

FIG. 10

DIFFERENCES IN SETTINGS

COMPARE RENDERED IMAGE    REFLECT SETTINGS
A7    A8

| DIFFERENT SETTING ITEMS | REFERENCE SETTINGS | COMPARATIVE SETTINGS |
|---|---|---|
| RIP TYPE | APPE | CPSI |
| PRIORITY: COLOR > CMS > OVERPRINT SECTION | OFF | ON |

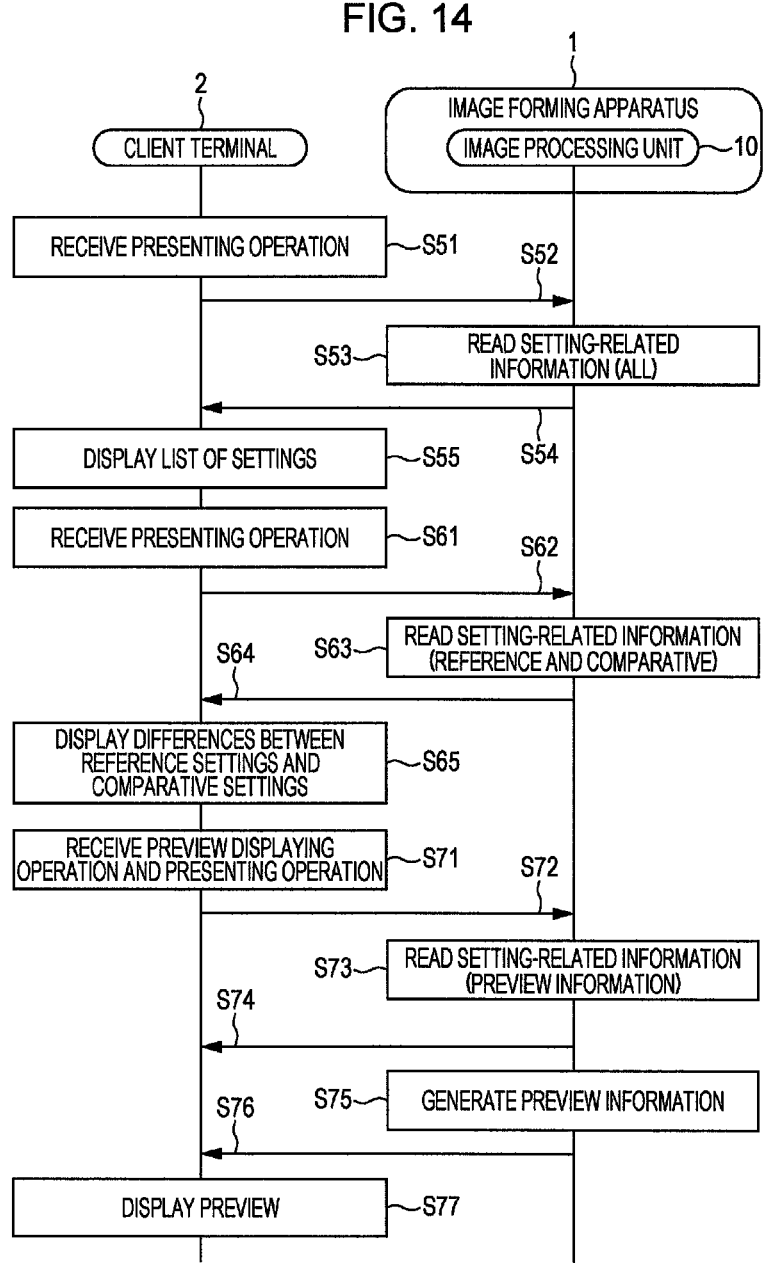

FIG. 15

| SETTING PROCESS HISTORY | | | |
|---|---|---|---|
| SETTING PROCESS HISTORY OF ID:002 | | | |
| RECORDED TIME | ID | OPERATING USER | CONTENTS OF SETTING PROCESS |
| ... | 01 | ××× | NGED |
| ... | 02 | ××× | ANGED |
| ... | 03 | ××× | ED |
| ... | 04 | ××× COMPARE WITH CURRENT SETTINGS ~A9 | HANGED |
| ... | 05 | ... | PREVIEW DISPLAYED |
| ... | 06 | ... | ... CHANGED |

OK    CANCEL

FIG. 16

DIFFERENCES IN SETTINGS

COMPARE RENDERED IMAGE | REFLECT SETTINGS ~A8

A10

| CHANGE/ NO CHANGE | DIFFERENT SETTING ITEMS | REFERENCE SETTINGS | COMPARATIVE SETTINGS |
|---|---|---|---|
| ✓ | RIP TYPE | APPE | CPSI |
|  | PRIORITY: COLOR > CMS > OVERPRINT SECTION | OFF | ON |
|  | ... | ... | ... |
| ✓ | ... | ... | ... |
| ✓ | ... | ... | ... |

IMAGE PROCESSING DEVICE, IMAGE PROCESSING METHOD, AND IMAGE FORMING APPARATUS

CROSS-REFERENCE TO RELATED APPLICATIONS

This application is based on and claims priority under 35 USC 119 from Japanese Patent Application No. 2016-120599 filed Jun. 17, 2016.

BACKGROUND

Technical Field

The present invention relates to image processing devices, image processing methods, and image forming apparatuses.

SUMMARY

According to an aspect of the invention, there is provided an image processing device including a memory and an output unit. The memory stores setting-related information related to a setting generated as a result of a setting process performed by a user for commanding an image forming unit to perform an image forming process. The output unit outputs the stored setting-related information in accordance with an operation performed by the user.

BRIEF DESCRIPTION OF THE DRAWINGS

Exemplary embodiments of the present invention will be described in detail based on the following figures, wherein:

FIG. 5 illustrates an example of a displayed preview;

FIG. 6 illustrates an example of a displayed command-data list;

FIG. 7 illustrates an example of a presenting operation;

FIG. 8 illustrates an example of displayed setting-related information;

FIG. 9 illustrates an example of a displayed command-data list;

FIG. 10 illustrates an example of differences in displayed settings;

FIG. 14 illustrates an example of an operational procedure of devices in a presenting process;

FIG. 15 illustrates an example of a presenting operation according to a modification;

FIG. 16 illustrates an example of a method for selecting a setting item or items to be changed.

DETAILED DESCRIPTION

1. Exemplary Embodiment

Figure 1:
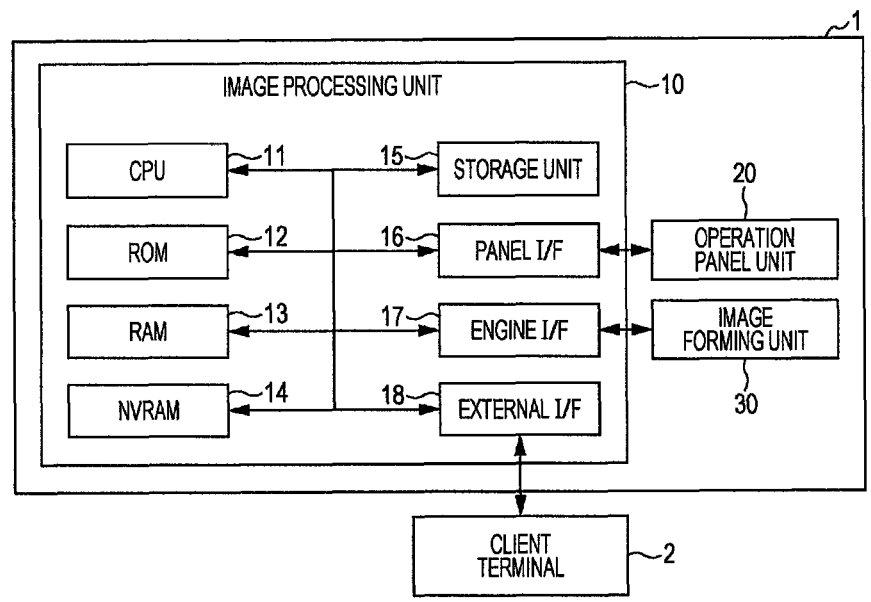
FIG. 1 illustrates a hardware configuration of an image forming apparatus according to an exemplary embodiment.

FIG. 1 illustrates a hardware configuration of an image forming apparatus 1 according to an exemplary embodiment. The image forming apparatus 1 forms an image onto a medium, such as a sheet. FIG. 1 shows a client terminal 2 that receives an operation for commanding the image forming apparatus 1 to form an image. When a user operates the client terminal 2 to designate an image to be formed onto a medium or to set image formation settings (such as sheet, layout, color, and image quality settings), the client terminal 2 transmits command data (also called a job) indicating the contents of the image formation command to the image forming apparatus 1. The image forming apparatus 1 then forms an image in accordance with the command indicated by the received command data.

The image forming apparatus 1 includes an image processing unit 10, an operation panel unit 20, and an image forming unit 30. The image processing unit 10 processes the image indicated by the aforementioned command data so as to convert the image into a format with which the image forming unit 30 is capable of forming the image onto the medium. The operation panel unit 20 includes a display and a touchscreen provided on the surface of the display, and displays the image as well as receiving an operation from the user. Based on the image data converted by the image processing unit 10, the image forming unit 30 forms the image indicated by the image data onto the medium by, for example, electrophotography.

The image processing unit 10 is a computer that includes a central processing unit (CPU) 11, a random access memory (RAM) 12, a read-only memory (ROM) 13, a nonvolatile RAM (NVRAM) 14, a storage unit 15, a panel interface (I/F) 16, an engine I/F 17, and an external I/F 18.

The CPU 11 uses the RAM 12 as a work area to execute a program stored in the ROM 13, the NVRAM 14, or the storage unit 15, thereby controlling the operation of each unit. The NVRAM 14 is a readable-writable memory that stores contents therein even when the apparatus is shut down, and stores data and programs to be used for control by the CPU 11. The storage unit 15 is, for example, a hard disk drive (HDD) or a solid state drive (SSD) and stores data and programs to be used for control by the CPU 11.

The panel I/F 16 is connected to the operation panel unit 20 and relays data exchanged between the operation panel unit 20 and the CPU 11. Examples of such data include image data of an image displayed by the operation panel unit 20 and operation data indicating an operation received by the operation panel unit 20. The engine I/F 17 is connected to the image forming unit 30. When the CPU 11 supplies job data indicating an image formation command for the image forming unit 30, the engine I/F 17 relays the job data and supplies it to the image forming unit 30. The external I/F 18 is connected to the client terminal 2 and relays data exchanged between the client terminal 2 and the CPU 11. For example, the external I/F 18 receives command data transmitted from the client terminal 2 and supplies it to the CPU 11.

Figure 2:
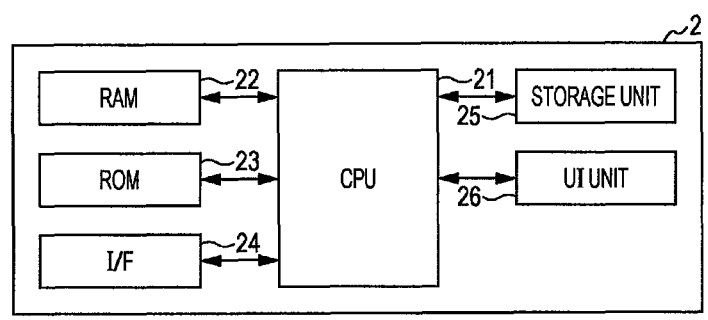
FIG. 2 illustrates a hardware configuration of a client terminal.

FIG. 2 illustrates a hardware configuration of the client terminal 2. The client terminal 2 is a computer that includes a CPU 21, a RAM 22, a ROM 23, an I/F 24, a storage unit 25, and a user interface (UI) unit 26. The CPU 21, the RAM 22, the ROM 23, and the storage unit 25 are hardware devices similar to the hardware devices of the same names shown in FIG. 1. The I/F 24 is connected to the image forming apparatus 1 and relays data exchanged between the image forming apparatus 1 and the CPU 21. The UI unit 26 includes, for example, a display, a keyboard, and a mouse and displays an image and receives an operation from a user.

The CPU 11 included in the image processing unit 10 and the CPU 21 included in the client terminal 2 respectively execute programs to control the respective units, whereby the following functions are realized. In this exemplary embodiment, functions to be realized when the user operates the client terminal 2 will be described. Functions to be realized when the user operates the operation panel unit 20 will be described in modifications.

Figure 3:
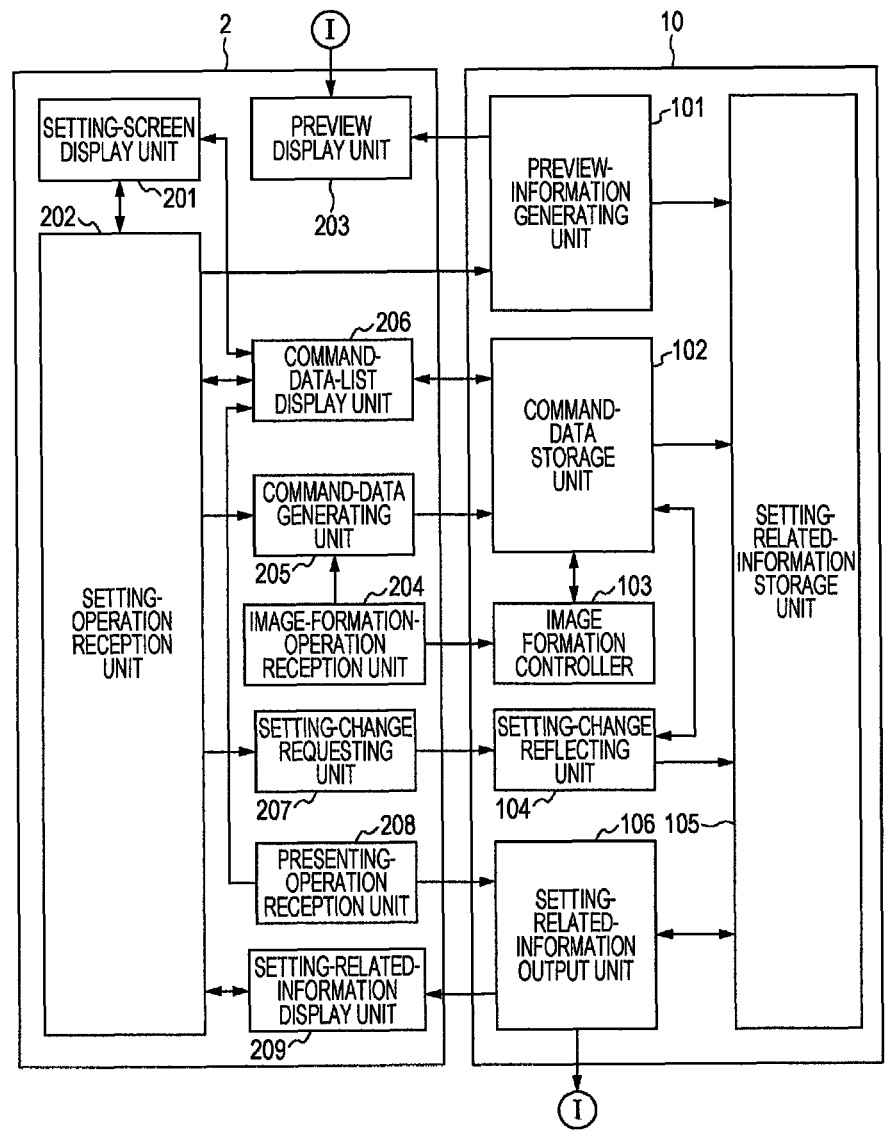
FIG. 3 illustrates a functional configuration realized by an image processing unit and the client terminal.

FIG. 3 illustrates a functional configuration realized by the image processing unit 10 and the client terminal 2. The image processing unit 10 includes a preview-information generating unit 101 that generates preview information, a command-data storage unit 102 that stores command data, an image formation controller 103, a setting-change reflecting unit 104 that reflects a change in a setting or settings, a setting-related-information storage unit 105 that stores setting-related information, and a setting-related-information output unit 106 that outputs setting-related information. The client terminal 2 includes a setting-screen display unit 201 that displays a setting screen, a setting-operation reception unit 202 that receives a setting-related operation, a preview display unit 203 that displays a preview, an image-formation-operation reception unit 204 that receives an operation related to image formation, a command-data generating unit 205 that generates command data, a command-data-list display unit 206 that displays a command-data list, a setting-change requesting unit 207 that makes a request for changing the setting or settings, a presenting-operation reception unit 208 that receives a presenting operation, and a setting-related-information display unit 209 that displays setting-related information.

When commanding the image forming apparatus 1 to form an image, the setting-screen display unit 201 displays a setting screen for selecting various kinds of settings.

Figure 4:
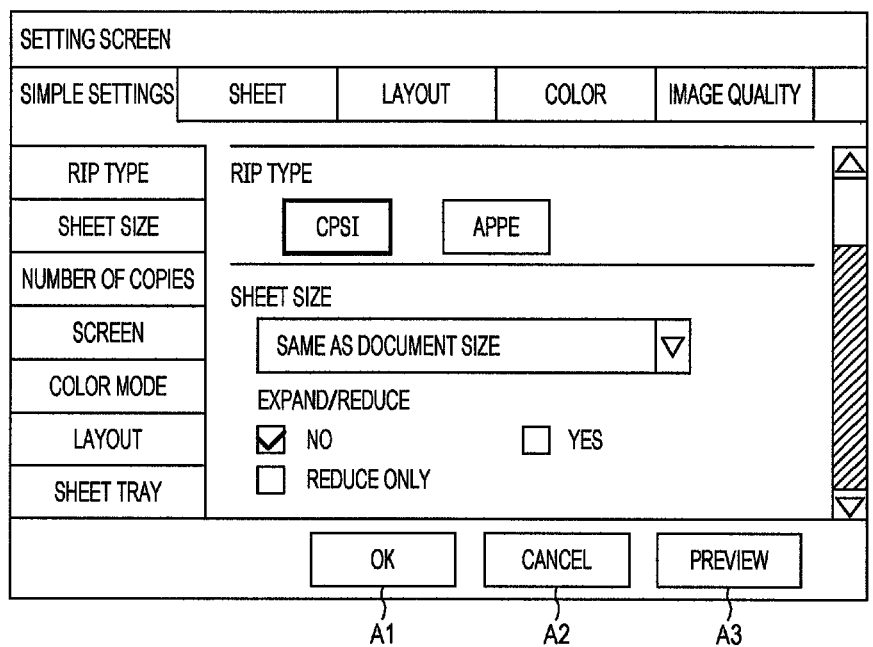
FIG. 4 illustrates an example of a setting screen.

FIG. 4 illustrates an example of the setting screen. In the example in FIG. 4, the setting-screen display unit 201 displays tabs indicating groups of setting items, such as "simple settings", "sheet", "layout", "color", and "image quality" items, setting items for the "simple settings" group from "RIP type" to "sheet tray", "CPSI" and "APPE" settings for the "RIP type" item, a "same as document size" setting and an "expand/reduce" setting for a "sheet size" item, and operation button images (i.e., an OK button A1, a cancel button A2, and a preview button A3). When another tab is selected or the screen is scrolled, the setting-screen display unit 201 displays another setting item and other settings for items.

When the user makes an image formation command, the setting-operation reception unit 202 receives an operation (referred to as "setting operation" hereinafter) for selecting the settings to be used in that image forming process. For example, when the setting screen shown in FIG. 4 is displayed, the setting-operation reception unit 202 receives an operation for selecting a configurable postscript interpreter (CPSI) as the RIP type or an operation for selecting an Adobe PDF print engine (APPE) as the setting operation. Furthermore, the setting-operation reception unit 202 receives an operation for pressing the OK button A1 shown in FIG. 4 as a setting operation for confirming the currently-selected settings.

Moreover, the setting-operation reception unit 202 receives an operation for pressing the cancel button A2 as a setting operation for cancelling the currently-selected settings and restoring the state prior to the displaying of the setting screen. Furthermore, the setting-operation reception unit 202 receives an operation for pressing the preview button A3 as a setting operation for displaying a printed image, that is, a preview, in a case where the image is formed using the currently-selected settings. When the setting-operation reception unit 202 receives the setting operation for displaying a preview, the setting-operation reception unit 202 sends a notification to the image processing unit 10.

When the preview-information generating unit 101 of the image processing unit 10 receives the notification, the preview-information generating unit 101 generates preview information indicating the preview of the image when formed on a medium in response to the image formation command. For example, the preview-information generating unit 101 generates preview information in a case where the image is formed using the currently-selected settings. The preview-information generating unit 101 transmits the generated preview information to the client terminal 2.

When the preview display unit 203 of the client terminal 2 receives the transmitted preview information, the preview display unit 203 displays the preview indicated by the preview information.

FIG. 5 illustrates an example of the displayed preview. In the example in FIG. 5, the preview display unit 203 displays a preview B1 including multiple thumbnail images corresponding to the image formation command and a preview of the selected one of the images. When the user views the preview and ascertains that the selected image is the intended image, the user performs an operation for closing the preview B1 and starting an image forming process.

The image-formation-operation reception unit 204 receives an operation related to an image forming process. For example, the image-formation-operation reception unit 204 receives a starting operation for starting an image forming process using the currently-selected settings or a stopping operation for stopping the image forming process as an image formation operation. When the image-formation-operation reception unit 204 receives the starting operation, the image-formation-operation reception unit 204 sends a notification to the command-data generating unit 205. When the image-formation-operation reception unit 204 receives the stopping operation, the image-formation-operation reception unit 204 sends a notification to the image forming apparatus 1.

When the starting operation is received by the image-formation-operation reception unit 204, the command-data generating unit 205 generates command data (i.e., so-called job) indicating a command for performing an image forming process using the currently-selected settings. The command data contains image information indicating an image to be formed by the image forming unit 30, the settings to be used in that image forming process, and the username of the user that has made the command. The command-data generating unit 205 transmits the generated command data to the image forming apparatus 1.

The command-data storage unit 102 has a function of storing the image-formation command data and, for example, stores the command data transmitted from the client terminal 2. The command-data storage unit 102 stores the command data by dividing it into five statuses. For example, the five different statuses of the command data stored in the command-data storage unit 102 include a "pending" status, a "waiting to be processed" status, a "completed" status, an "error" status, and a "history" status. The "pending" status indicates that the command data is stored in a queue in response to an image-formation starting operation and is waiting for its turn in the order used in the image forming process. The "waiting to be processed" status indicates that an image-formation starting operation has not been performed yet or that the starting operation has been performed once but has been subsequently stopped so that the command data is waiting to be processed. The "completed" status indicates that the process for forming the image onto the medium has been completed. The "error" status indicates that the process for forming the image onto the medium has failed. The "history" status indicates that a predetermined period has elapsed since the completion of the process for forming the image onto the medium.

The image formation controller 103 controls the image forming process performed by the image forming unit 30. In a case where the command data is stored in the "pending" status in the command-data storage unit 102, the image formation controller 103 reads the command data in a predetermined order and commands the image forming unit 30 to form the image in accordance with the command indicated by the read command data. As a result, when the image is formed onto a medium, the image formation controller 103 changes the status of the command data from the "pending" status to the "completed" status. When a certain period elapses after changing the status to the "completed" status, the image formation controller 103 changes the status of the command data to the "history" status.

If the image formation controller 103 is notified by the image-formation-operation reception unit 204 of the client terminal 2 that a stopping operation is received, the image formation controller 103 changes the status of the relevant command data stored in the command-data storage unit 102 from the "pending" status to the "waiting to be processed" status. Furthermore, when an image formation command is made but an image is not formed due to an error, the image formation controller 103 changes the status of the read command data from the "pending" status to the "error" status.

The command-data-list display unit 206 displays a command-data list stored in the command-data storage unit 102. When an operation for displaying this list is performed, the command-data-list display unit 206 makes a request for command data to the image processing unit 10. When the command-data storage unit 102 receives this request, the command-data storage unit 102 transmits the stored command data to the client terminal 2. The command-data-list display unit 206 displays the command-data list based on the transmitted command data.

FIG. 6 illustrates an example of the displayed command-data list. In the example in FIG. 6, the command-data-list display unit 206 displays tabs indicating the "history", "pending", "waiting to be processed", "completed", and "error" statuses and the command-data list corresponding to the "completed" status. For example, if an image is formed on a medium but is not formed in a desired color or layout, the user may sometimes change the settings indicated by the command data and make a command for forming the image again. In that case, for example, the user performs an operation for displaying the command-data list and selecting the command data for which the settings are to be changed.

The setting-operation reception unit 202 receives this operation as a setting operation and commands the setting-screen display unit 201 to display the setting screen for the settings indicated by the selected command data. In accordance with this command, the setting-screen display unit 201 acquires the selected command data from the command-data-list display unit 206 and displays the setting screen indicating the settings included in the acquired command data. When the user changes the settings on this setting screen and presses the OK button A1 shown in FIG. 4, the setting-operation reception unit 202 receives this operation as an operation (setting-change reflecting operation) for reflecting the change in the settings indicated by this command data and sends a notification to the setting-change requesting unit 207.

When the setting-operation reception unit 202 receives the setting-change reflecting operation, the setting-change requesting unit 207 requests the image processing unit 10 to reflect the change in the settings of the command data performed on the setting screen. The setting-change requesting unit 207 transmits request data indicating this request and the username of the user who has performed the changing operation to the image processing unit 10.

The setting-change reflecting unit 104 of the image processing unit 10 reflects the change in the settings requested by the setting-change requesting unit 207 onto the relevant command data. When the setting-change reflecting unit 104 receives the request data transmitted from the setting-change requesting unit 207, the setting-change reflecting unit 104 reads the command data indicated by the request data from the command-data storage unit 102, changes the settings contained in the command data to the settings indicated by the request data, and overwrites and saves the command data. Subsequently, the user performs an image-formation starting operation with respect to this command data, so that an image forming process with the changed settings reflected therein is performed.

The setting-related-information storage unit 105 stores setting-related information generated as a result of a setting process performed by the user for commanding the image forming unit 30 to perform an image forming process. The setting-related-information storage unit 105 corresponds to an example of a "memory" according to an exemplary embodiment of the present invention. The setting-related-information storage unit 105 stores therein the settings for a commanded image forming process as the setting-related information. Furthermore, in addition to the settings, the setting-related-information storage unit 105 stores therein the above-described preview information (i.e., information indicating a preview of an image when formed on a medium in response to an image formation command) as the setting-related information.

When the command-data storage unit 102 stores the command data, the command-data storage unit 102 supplies the stored command data to the setting-related-information storage unit 105. The setting-related-information storage unit 105 stores therein, for example, the settings, the image information, and the username of the user who has made the command for the image forming process contained in the supplied command data as the setting-related information. When the setting-change reflecting unit 104 receives request data for requesting a change in the settings, the setting-change reflecting unit 104 supplies the request data to the setting-related-information storage unit 105. The setting-related-information storage unit 105 stores therein, for example, the changed settings and the username of the user who has requested the change indicated by the supplied request data as the setting-related information.

When the preview-information generating unit 101 generates the preview information, the preview-information generating unit 101 supplies the generated preview information and the username of the user who has performed the preview displaying operation to the setting-related-information storage unit 105. The setting-related-information storage unit 105 stores therein the supplied preview information and the username as the setting-related information. When storing the setting-related information, the setting-relatedinformation storage unit 105 stores the setting-related information with the current time and date contained therein as the recorded time and date.

The settings indicated by the setting-related information stored in this manner contain not only the settings used for the actual image forming process but also settings that have been changed to other settings without performing an image-formation starting operation after the setting process. Furthermore, the preview information is information generated when a preview displaying operation is performed. Accordingly, in addition to the setting-related information generated when an image-formation starting operation is performed in the setting process, the setting-related-information storage unit 105 stores therein setting-related information generated when an operation other than the starting operation is performed in the setting process.

The presenting-operation reception unit 208 of the client terminal 2 receives a presenting operation when the user performs the presenting operation for presenting the setting-related information. The presenting operation will be described below with reference to FIGS. 7 to 12.

FIG. 7 illustrates an example of the presenting operation. In the example in FIG. 7, a command-data list is displayed, and command data with the ID "002" is selected from the command data included in the list.

When the user clicks the right button in this state, an operation menu including a display-setting-process-history button A4 and a compare-settings button A5 is displayed. When the display-setting-process-history button A4 is pressed, the presenting-operation reception unit 208 receives this operation as a presenting operation. In this case, the presenting-operation reception unit 208 notifies the image processing unit 10 that the display-setting-process-history button A4 has been pressed in the state where the command data with the ID "002" is selected as the contents of the received presenting operation.

The setting-related-information output unit 106 of the image processing unit 10 outputs the setting-related information stored in the setting-related-information storage unit 105 in accordance with an operation performed by the user. The setting-related-information output unit 106 corresponds to an example of an "output unit" according to an exemplary embodiment of the present invention. When the setting-related-information output unit 106 receives the aforementioned notification from the presenting-operation reception unit 208, the setting-related-information output unit 106 reads the setting-related information indicated by the command data with the ID "002" from the setting-related information stored in the setting-related-information storage unit 105 and outputs the read setting-related information to the client terminal 2.

The setting-related-information display unit 209 of the client terminal 2 displays the setting-related information output by the setting-related-information output unit 106. For example, the setting-related-information display unit 209 displays the setting-related information indicated by the command data with the ID "002" output as described above.

FIG. 8 illustrates an example of the displayed setting-related information. In the example in FIG. 8, the setting-related-information display unit 209 displays the "recorded time", "ID", "operating user", and "contents of setting process" as the "setting process history of ID:002".

With regard to the "ID" shown in FIG. 8, since there are multiple pieces of setting-related information indicated by the command data with the ID "002", the IDs are identification information allocated for identifying these pieces of setting-related information. The "operating user" is the username of the user who has performed the process when each piece of setting-related information is generated. As the "contents of setting process", for example, the setting-related-information display unit 209 displays the contents of a changed setting item, such as "RIP type changed" or "sheet size changed", as well as the contents of a setting operation other than the changed settings, such as "preview displayed".

A changed setting item is not limited to a single item. If the user changes multiple settings in a single process, the setting-related-information display unit 209 displays the multiple setting items that have been changed. Moreover, in the screen in FIG. 8, only a portion of information indicated by the setting-related information is shown. When a specific operation (such as a double-click) is performed with respect to the displayed setting-related information, the setting-related-information display unit 209 displays the details of that setting-related information.

When the compare-settings button A5 is pressed in the state shown in the example in FIG. 8, the presenting-operation reception unit 208 receives this operation as a presenting operation and notifies the command-data-list display unit 206 that this operation has been received. When the command-data-list display unit 206 receives this notification, the command-data-list display unit 206 displays a button for selecting a comparative target.

FIG. 9 illustrates an example of the displayed command-data list. In the example in FIG. 9, the command-data-list display unit 206 displays a select-as-comparative-target button A6 in place of the OK button for the command-data list shown in FIG. 7. When the user selects any one of the displayed command data and presses the select-as-comparative-target button A6, the presenting-operation reception unit 208 receives this operation as a presenting operation.

In this case, the presenting-operation reception unit 208 transmits, to the image processing unit 10, comparison data indicating information for specifying the setting-related information (referred to as "reference setting-related information") of the command data selected in the presenting operation received via the command-data list screen in FIG. 7 and information for specifying the setting-related information (referred to as "comparative setting-related information") of the command data selected in the presenting operation received via the command-data list screen in FIG. 9. The information for specifying the setting-related information is, for example, the ID of the command data indicated by that setting-related information.

When the setting-related-information output unit 106 receives the comparison data from the presenting-operation reception unit 208, the setting-related-information output unit 106 reads the reference setting-related information and the comparative setting-related information indicated by the comparison data from the setting-related information stored in the setting-related-information storage unit 105 and outputs the read reference setting-related information and the comparative setting-related information to the client terminal 2. Accordingly, the setting-related-information output unit 106 outputs the reference setting-related information stored in the setting-related-information storage unit 105 together with another setting-related information stored in the setting-related-information storage unit 105 as a comparative target with that reference setting-related information.

The setting-related-information display unit 209 displays the settings indicated by the output reference setting-related information and the setting indicated by the comparative setting-related information. In the following description, the settings indicated by the reference setting-related information will simply be referred to as "reference settings", and the settings indicated by the comparative setting-related information will simply be referred to as "comparative settings". In this exemplary embodiment, the setting-related-information display unit 209 displays the differences between the reference settings and the comparative settings instead of displaying all of the reference settings and comparative settings.

FIG. 10 illustrates an example of the differences in the displayed settings. In the example in FIG. 10, the differences displayed by the setting-related-information display unit 209 include a setting item of "RIP type", a reference setting of "APPE", and a comparative setting of "CPSI", and also include a setting item of "priority: color>CMS>overprint section", a reference setting of "OFF", and a comparative setting of "ON".

In the example in FIG. 10, setting-related information indicated by command data with an ID "002" is output as reference setting-related information, and setting-related information indicated by command data with an ID "001" different therefrom is output as comparative setting-related information. The differences in the IDs of the command data imply that these pieces of command data have been generated in response to different image formation commands.

Accordingly, the setting-related-information output unit 106 outputs the reference setting-related information stored in the setting-related-information storage unit 105 together with setting-related information, as a comparative target with that reference setting-related information, corresponding to an image formation command different from the image formation command corresponding to the setting process in which the reference setting-related information is generated.

In the example in FIG. 10, the setting-related-information output unit 106 outputs the reference setting-related information and the comparative setting-related information stored in the setting-related-information storage unit 105 so as to ultimately output the differences between the reference settings and the comparative settings. Alternatively, instead of entirely outputting the reference setting-related information and the comparative setting-related information, the setting-related-information output unit 106 may only output the differences between the reference settings and the comparative settings indicated by these pieces of setting-related information. In that case, the setting-related-information display unit 209 similarly displays the differences shown in FIG. 10.

The setting-related-information display unit 209 displays a compare-rendered-image button A7 and a reflect-settings button A8 on the setting-related-information difference screen in FIG. 10. When the compare-rendered-image button A7 is pressed, the presenting-operation reception unit 208 receives this operation as a presenting operation and requests the image processing unit 10 for preview information contained in the reference setting-related information and preview information contained in the comparative setting-related information. In response to this request, the setting-related-information output unit 106 reads these pieces of preview information from the setting-related-information storage unit 105 and outputs the preview information to the client terminal 2.

However, since preview information is not contained in the setting-related information unless a preview displaying operation is performed in the setting process, the setting-related-information output unit 106 outputs read preview information only when that preview information is successfully read. In this example, it is assumed that preview information indicating a preview (comparative preview) in the settings indicated by the comparative setting-related information is output.

In that case, the setting-operation reception unit 202 receives an operation for pressing the compare-rendered-image button A7 as a setting operation, and the preview-information generating unit 101 generates preview information indicating a preview (reference preview) in the settings indicated by the reference setting-related information that has not been output. The preview display unit 203 displays a reference preview by using the preview information generated by the preview-information generating unit 101 in this manner, and displays a comparative preview by using the preview information output from the setting-related-information output unit 106.

Figure 11:
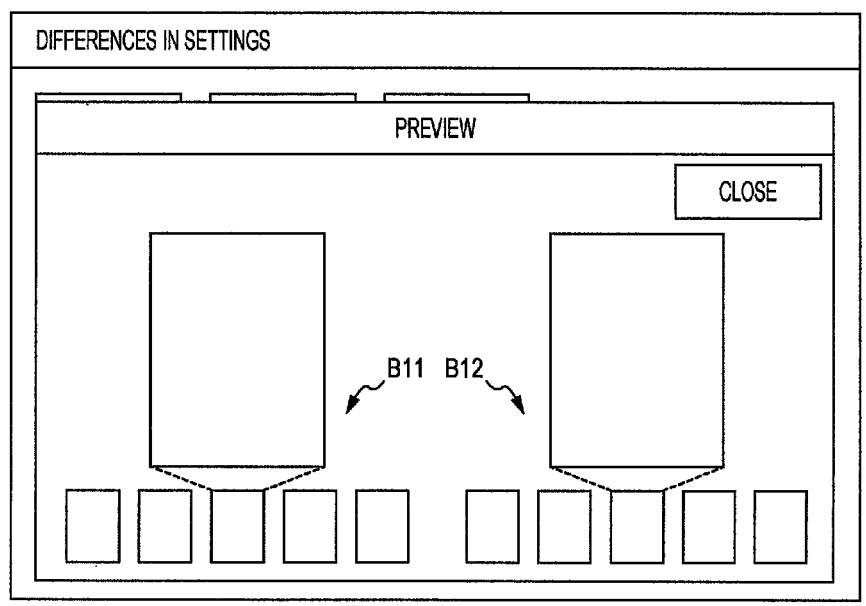
FIG. 11 illustrates an example of two displayed previews.

FIG. 11 illustrates an example of the two displayed previews. In the example in FIG. 11, the preview display unit 203 displays a reference preview B11 and a comparative preview B12. When the user compares these previews and ascertains that a desired image will be formed by changing the comparative settings to the reference settings, the user closes the previews and presses the reflect-settings button A8. When this operation is performed, the setting-operation reception unit 202 receives this operation as a changing operation (i.e., an operation for changing the settings indicated by the command data). Then, the setting-change requesting unit 207 requests this change, and the setting-change reflecting unit 104 reflects the requested change in the settings.

Accordingly, when the user performs a specific operation (i.e., pressing of the reflect-settings button A8 in this example) after comparative setting-related information is output from the setting-related-information output unit 106, the setting-change reflecting unit 104 changes the reference settings to the comparative settings. Alternatively, when a specific operation is performed (i.e., pressing of the reflect-settings button A8), the setting-change reflecting unit 104 may change the comparative settings to the reference settings.

Furthermore, the setting-related-information display unit 209 may display a button for changing the reference settings to the comparative settings and a button for changing the comparative settings to the reference settings. In that case, when either button is pressed (i.e., a specific operation in this case), the setting-change reflecting unit 104 may make changes in accordance with the operated button. Accordingly, when the user performs a specific operation after comparative setting-related information is output from the setting-related-information output unit 106, the setting-change reflecting unit 104 may change the settings indicated by one of the reference setting-related information and the comparative setting-related information to the settings indicated by the other setting-related information. The setting-change reflecting unit 104 corresponds to an example of a "changing unit" according to an exemplary embodiment of the present invention.

Based on the above-described configuration, the image forming apparatus 1 and the client terminal 2 perform an image forming process for forming an image onto a medium, a storing process for storing setting-related information when, for example, the settings are changed, and a presenting process for presenting the setting-related information to the user.

Figure 12:
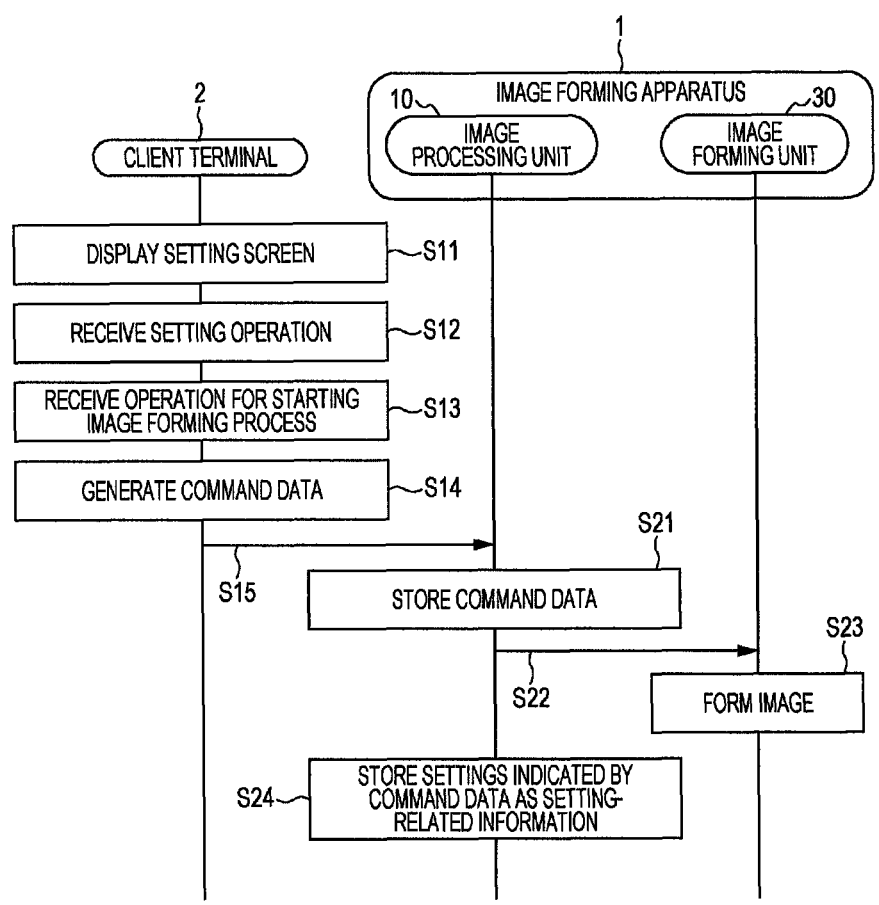
FIG. 12 illustrates an example of an operational procedure of devices in an image forming process.

FIG. 12 illustrates an example of an operational procedure of the devices in the image forming process. For example, this operational procedure commences when the user performs an operation for displaying the setting screen. First, in step S11, the client terminal 2 (i.e., the setting-screen display unit 201) displays the setting screen. Then, in step S12, the client terminal 2 (i.e., the setting-operation reception unit 202) receives an operation for individually selecting the settings for the respective items.

Subsequently, in step S13, the client terminal 2 (i.e., the image-formation-operation reception unit 204) receives an operation for starting an image forming process. Then, the client terminal 2 (i.e., the command-data generating unit 205) generates command data in step S14 and transmits the generated command data to the image forming apparatus 1 in step S15. When the image processing unit 10 (i.e., the command-data storage unit 102) receives the command data in step S15, the image processing unit 10 (i.e., the command-data storage unit 102) stores the received command data in step S21.

Subsequently, in step S22, the image processing unit 10 (i.e., the image formation controller 103) commands the image forming unit 30 to perform an image forming process based on the stored command data. In step S23, the image forming unit 30 forms an image onto a medium based on the command received in step S22. Then, in step S24, the image processing unit 10 (i.e., the setting-related-information storage unit 105) stores the settings indicated by the command data stored in step S21 as setting-related information. Step S24 may be performed concurrently with step S22 or may be performed prior to step S22.

Figure 13:
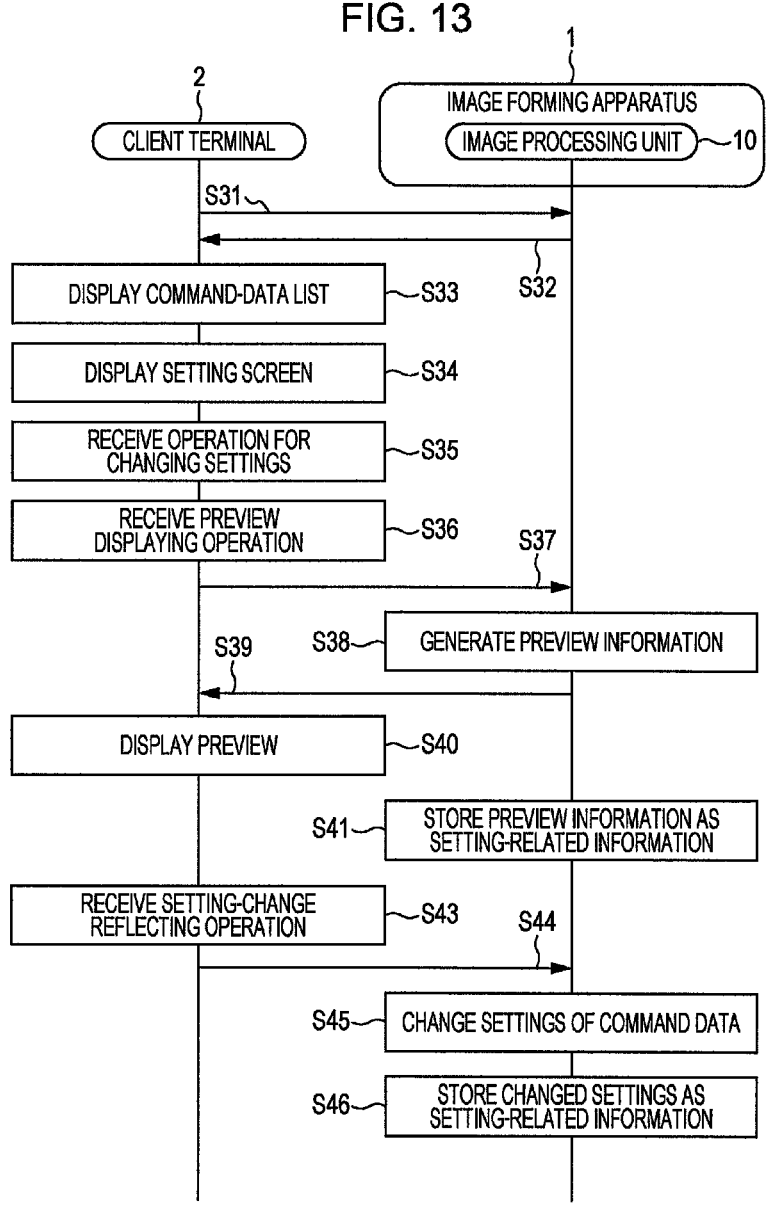
FIG. 13 illustrates an example of an operational procedure of devices in a storing process.

FIG. 13 illustrates an example of an operational procedure of the devices in the storing process. For example, this operational procedure commences when the user performs an operation for displaying the command-data list. First, in step S31, the client terminal 2 (i.e., the command-data-list display unit 206) makes a request for the command data to the image processing unit 10. In step S32, the image processing unit 10 (i.e., the command-data storage unit 102) responds to the request received in step S31 and transmits all of the stored pieces of command data to the client terminal 2. In step S33, the client terminal 2 (i.e., the command-data-list display unit 206) displays the list of transmitted command data.

When the user performs an operation for selecting any one of the pieces of command data from the list, the client terminal 2 (i.e., the setting-screen display unit 201) displays the setting screen for the selected command data in step S34, as shown in FIG. 4. Then, when the user performs an operation for changing the settings, the client terminal 2 (i.e., the setting-operation reception unit 202) receives this operation for changing the settings in step S35. Furthermore, when the user performs an operation for displaying a preview based on the changed settings, the client terminal 2 (i.e., the setting-operation reception unit 202) receives this operation as an operation for changing the settings in step S36 and then sends a notification to the image processing unit 10 in step S37. When the image processing unit 10 (i.e., the preview-information generating unit 101) receives this notification, the image processing unit 10 (i.e., the preview-information generating unit 101) generates preview information in step S38 and transmits the generated preview information to the client terminal 2 in step S39.

When the client terminal 2 (i.e., the preview display unit 203) receives the preview information in step S39, the client terminal 2 (i.e., the preview display unit 203) displays a preview indicated by the preview information in step S40. In step S41, the image processing unit 10 (i.e., the setting-related-information storage unit 105) stores the preview information generated in step S38 as setting-related information. Subsequently, when the user presses the OK button A1 in the setting screen shown in FIG. 4, the client terminal 2 (i.e., the setting-operation reception unit 202) receives this operation as an operation (setting-change reflecting operation) for reflecting the change in the settings of the command data in step S43.

Subsequently, in step S44, the client terminal 2 (i.e., the setting-change requesting unit 207) requests the image processing unit 10 to reflect the change in the settings of the command data. In step S45, the image processing unit 10 (i.e., the setting-change reflecting unit 104) changes the settings of the command data stored in the command-data storage unit 102 in accordance with the request received in step S44. Then, in step S46, the image processing unit 10 (i.e., the setting-related-information storage unit 105) stores the settings changed in step S45 as setting-related information.

FIG. 14 illustrates an example of an operational procedure of the devices in the presenting process. For example, this operational procedure commences when the client terminal 2 (i.e., the command-data-list display unit 206) displays the command-data list. When the user selects any one of the pieces of command data from the displayed list, clicks the right button to display the operation menu shown in FIG. 7, and presses the compare-settings button A5, the client terminal 2 (i.e., the presenting-operation reception unit 208) receives this operation as a presenting operation for presenting the setting-related information in step S51 and sends a notification to the image processing unit 10 in step S52.

When the image processing unit 10 (i.e., the setting-related-information output unit 106) receives the notification in step S52, the image processing unit 10 (i.e., the setting-related-information output unit 106) reads all of the pieces of setting-related information stored in the setting-related-information storage unit 105 in step S53 and transmits the read setting-related information to the client terminal 2 in step S54. In step S55, the client terminal 2 (i.e., the setting-related-information display unit 209) displays the list of transmitted setting-related information, as shown in the example in FIG. 9.

Subsequently, when the user selects any one of the pieces of setting-related information from the displayed list and presses the select-as-comparative-target button A6 shown in FIG. 9, the client terminal 2 (i.e., the presenting-operation reception unit 208) receives this operation as a presenting operation for presenting the setting-related information in step S61 and transmits the above-described comparison data (i.e., data indicating information for specifying the reference setting-related information and information for specifying the comparative setting-related information) to the image processing unit 10 in step S62.

When the image processing unit 10 (i.e., the setting-related-information output unit 106) receives the comparison data, the image processing unit 10 reads the reference setting-related information and the comparative setting-related information from the setting-related information stored in the setting-related-information storage unit 105 in step S63 and transmits the read pieces of setting-related information to the client terminal 2 in step S64. In step S65, the client terminal 2 (i.e., the setting-related-information display unit 209) displays the differences in the settings indicated by the transmitted pieces of setting-related information, as shown in the example in FIG. 10.

When the user presses the compare-rendered-image button A7 shown in FIG. 10, the client terminal 2 (i.e., the setting-operation reception unit 202 and the presenting-operation reception unit 208) receives this operation as a preview displaying operation and a presenting operation for presenting the setting-related information in step S71. Then, in step S72, the client terminal 2 (i.e., the presenting-operation reception unit 208) makes a request for preview information contained in the reference setting-related information and the comparative setting-related information to the image processing unit 10. When the image processing unit 10 (i.e., the setting-related-information output unit 106) receives this request, the image processing unit 10 (i.e., the setting-related-information output unit 106) reads the requested preview information from the setting-related information stored in the setting-related-information storage unit 105 in step S73 and transmits the read preview information (i.e., preview information indicating a comparative preview in this example) to the client terminal 2 in step S74.

If there is preview information that is requested but is not stored in the setting-related-information storage unit 105, the image processing unit 10 (i.e., the preview-information generating unit 101) generates the preview information (i.e., preview information indicating a reference preview in this example) in step S75 and transmits the generated preview information to the client terminal 2 in step S76. In step S77, the client terminal 2 (i.e., the preview display unit 203) displays the reference preview by using the preview information generated in step S75 and displays the comparative preview by using the preview information output in step S74.

In this exemplary embodiment, the user performs the presenting operation described with reference to the example in FIG. 7 or 9 so that setting-related information is output and displayed. The setting-related information includes image formation settings and preview information selected or changed in accordance with a past setting operation performed by the user and indicates the contents of the past setting process. Accordingly, in this exemplary embodiment, the contents of the past setting process are presented when commanding an image forming process.

Furthermore, in this exemplary embodiment, setting-related information generated when an operation other than the starting operation for starting an image forming process is stored. Thus, past settings that have not been previously used for an image forming process are also utilized. Moreover, in this exemplary embodiment, the setting-related information stored in the setting-related-information storage unit 105 is output both as reference setting-related information and comparative setting-related information. Thus, the contents of past setting processes are compared.

Furthermore, in the examples described with reference to FIGS. 7 to 10, the relevant image formation command varies between the setting process for generating reference setting-related information and the setting process for generating comparative setting-related information. Thus, the contents of the setting processes performed with respect to different image-formation commands are compared. In the example in FIG. 10, the setting-related-information output unit 106 outputs the differences between the reference settings and the comparative settings so that the comparison of the differences between the two settings may be simplified, as compared with a case where the settings are entirely output.

Furthermore, in this exemplary embodiment, the user performs a specific operation after the comparative setting-related information is output so that the reference settings are changed to the comparative settings or the comparative settings are changed to the reference settings. Because an operation in which the setting-related information output in this manner is used for changing the settings is provided, the utilization of the output setting-related information for changing the settings may be simplified, as compared with a case where such an operation is not provided.

2. Modifications

The above-described exemplary embodiment is merely an example of an exemplary embodiment of the present invention and may be modified as follows. Furthermore, the exemplary embodiment and modifications may be combined, where appropriate.

2.1. Setting-Related Information

The setting-related information stored in the setting-related-information storage unit 105 is not limited to that described above. For example, the setting-related-information storage unit 105 may store screen transition information indicating screen transition caused as a result of a setting process as the setting-related information.

The term "screen transition" in this case not only refers to transition from a certain screen to another screen but also includes transition of an image displayed on a single screen caused by, for example, moving the cursor of the mouse or inputting text. This becomes reference for the user with regard to how the setting process is to be performed. Furthermore, the setting-related information may include any kind of information so long as the information is related to the settings, such as the time and date when the setting process is performed, the device or devices used for performing the setting operation, or information for specifying the application program.

2.2. Comparative-Target Setting Method

The method for setting the comparative setting-related information is not limited to that described above.

FIG. 15 illustrates an example of the comparative-target setting method according to this modification. In the example in FIG. 15, the setting-related-information display unit 209 is displaying a setting-process history of ID "002" and is also displaying an operation menu in a state where a setting-process history of ID "03" is selected. This operation menu includes a compare-with-current-settings button A9.

When the compare-with-current-settings button A9 is pressed, the presenting-operation reception unit 208 receives this operation as a presenting operation and sends a notification to the image processing unit 10. In this case, as a comparative target with the reference setting-related information (i.e., the setting-related information of ID "03" in this example), the setting-related-information output unit 106 outputs the current setting-related information with respect to the image formation command corresponding to the setting process in which the reference setting-related information is generated. Specifically, of the setting-related information of ID "002", the setting-related-information output unit 106 outputs the setting-related information with the newest recorded time and date as the current setting-related information.

As a result, for example, the setting-related-information display unit 209 displays the differences between the output reference settings (i.e., the settings indicated by the setting-related information of ID "03") and the comparative settings (i.e., the settings indicated by the current setting-related information), as shown in the example in FIG. 10. In this modification, the user viewing these displayed differences compares the settings according to the past setting process with the current settings.

In the example in FIG. 15, the pressing of the compare-with-current-settings button A9 serves both as an operation for setting the comparative setting-related information and an operation for displaying the differences between the settings indicated by the two selected pieces of setting-related information. By using a common operation as an operation for selecting the setting-related information and an operation for displaying the setting-related information in this manner, the number of times the user performs an operation may be reduced, as compared with a case where these operations are independent operations.

2.3. Setting Items to be Changed

Although the setting-change reflecting unit 104 makes changes to all setting items when the reflect-settings button A8 is pressed in the example in FIG. 10, for example, the setting-change reflecting unit 104 may alternatively allow the user to select a setting item to be changed. In this case, the term "item" includes a single item or multiple items, and the term "setting" includes a single setting or multiple settings.

FIG. 16 illustrates an example of a method for selecting a setting item to be changed. In the example in FIG. 16, the setting-related-information display unit 209 is displaying the differences between the reference settings and the comparative settings. The setting-related-information display unit 209 displays a "change/no change" confirmation checkbox to the left of each piece of setting-related information. In this example, three of five pieces of setting-related information are checked. When the reflect-settings button A8 is pressed in this state, the setting-change requesting unit 207 makes a request for changing the settings of the three checked items but does not make a request for changing the settings of the two unchecked items.

The setting-change reflecting unit 104 reflects the changes only in the settings of the requested items. In other words, in this modification, when the user selects a setting item to be changed, the setting-change reflecting unit 104 only reflects the change in the settings of the selected item. As another alternative, for example, with regard to an item for which a setting range within which a normal image forming process is performed (i.e., normal setting range) is already set, if there is a request for making changes to settings not included in that range, the setting-change reflecting unit 104 may maintain the original settings without reflecting those settings.

Specifically, for example, in a case where a page range of first to fifth pages is set with respect to an image formation command with 10 pages of images and there is a request for changing the settings to a page range of first to 100-th pages, the setting-change reflecting unit 104 does not reflect those changes but maintains the setting of first to fifth pages. In this case, the setting-change reflecting unit 104 may change the settings of the relevant item to default settings. The term "default settings" refers to initial settings of each item set in advance so that the user does not have to set the settings for all items when commanding an image forming process.

2.4. Display Mode of Setting-Related Information

The setting-related-information display unit 209 may vary the display mode depending on the setting-related information to be displayed. For example, in a case where the reference settings and the comparative settings are to be entirely displayed, the setting-related-information display unit 209 displays the settings corresponding to the differences in a display mode different from that for other settings. Thus, even when the settings are to be entirely confirmed, the settings corresponding to the differences may be readily confirmed, as compared with a case where the display mode is uniform.

Furthermore, in a case where only the differences are to be displayed, for example, when one setting is changed to another setting, the setting-related-information display unit 209 may display the setting that becomes no longer included in the normal setting range in a display mode different from that for the other setting. Thus, a setting that becomes no longer included in the normal setting range when the setting is changed may be readily confirmed, as compared with a case where the display mode is uniform.

2.5. Setting-Related-Information Storage Unit

For example, although the setting-related-information storage unit 105 stores the settings of all items as the setting-related information every time the settings are changed in the exemplary embodiment, the setting-related-information storage unit 105 may alternatively store the settings of all items indicated by command data when the command data is stored for the first time, and may store only the settings of changed items (i.e., differences) thereafter. Thus, the amount of setting-related information to be stored may be reduced, as compared with a case where the settings of all items are always stored.

2.6. Devices that Realize Functions

The functions illustrated in FIG. 3 may be realized by devices different from those in the exemplary embodiment.

Figure 17:
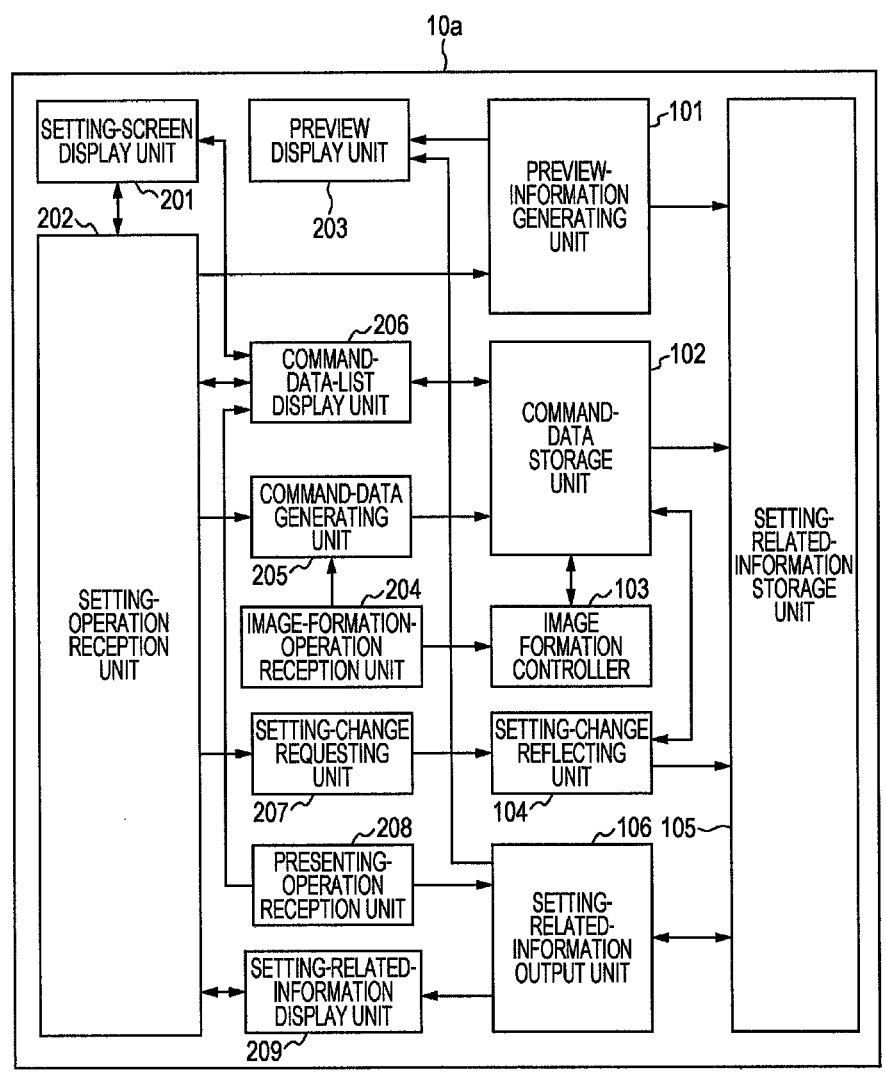
FIG. 17 illustrates an example of a functional configuration according to a modification.

FIG. 17 illustrates an example of a functional configuration according to this modification. In the example in FIG. 17, an image processing unit 10a that includes the units included in the client terminal 2 in addition to the units included in the image processing unit 10 shown in FIG. 3 is illustrated. In this case, the user views a screen displayed on the operation panel unit 20 included in the image forming apparatus 1 instead of the client terminal 2 so as to operate the operation panel unit 20.

2.7. Category of Exemplary Embodiment of Present Invention

In addition to an image processing device that processes an image like the image processing unit 10, an exemplary embodiment of the present invention may be regarded as an image forming apparatus that includes the image processing device and an image forming unit, or may be regarded as an image forming system having a device serving as a user interface, like the client terminal 2, added to an image forming apparatus. Furthermore, an exemplary embodiment of the present invention may be regarded as an image processing method for realizing the processes performed by the devices, or may be regarded as a functional program for causing a computer to control the devices. This program may be provided in the form of a storage medium storing the program, such as an optical disk, or may be made usable by being downloaded and installed into a computer via a communication line, such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
   a memory that stores setting-related information related to a setting generated as a result of a setting process performed by a user for commanding an image forming unit to perform an image forming process; and an output unit that outputs the stored setting-related information in accordance with an operation performed by the user, wherein, together with the stored setting-related information, the output unit outputs another piece of the stored setting-related information as comparative setting-related information.

2. The image processing device according to claim 1, wherein, in addition to the setting, the memory stores, as the setting-related information, information indicating screen transition caused by the setting process or information indicating a preview of an image formed on a medium in accordance with the command.

3. The image processing device according to claim 1, wherein the memory stores the setting-related information generated when an operation other than an operation for starting the image forming process is performed in the setting process.

4. The image processing device according to claim 1, wherein, together with the stored setting-related information, the output unit outputs setting-related information with respect to an image formation command different from an image formation command corresponding to the setting process in which the setting-related information is generated, the setting-related information with respect to the different image formation command being output as comparative setting-related information.

5. The image processing device according to claim 1, wherein, together with the stored setting-related information, the output unit outputs current setting-related information with respect to an image formation command corresponding to the setting process in which the setting-related information is generated, the current setting-related information being output as comparative setting-related information.

6. The image processing device according to claim 1, wherein the output unit outputs a difference between a setting indicated by the stored setting-related information and a setting indicated by the comparative setting-related information.

7. The image processing device according to claim 1, further comprising:

a changing unit that changes a setting indicated by one of the stored setting-related information and the output comparative setting-related information to a setting indicated by the other one of the stored setting-related information and the output comparative setting-related information if the user performs a specific operation after the comparative setting-related information is output.

8. An image forming apparatus comprising:

the image processing device according to claim 1; and an image forming unit that forms an image onto a medium.

9. An image processing method comprising:

storing setting-related information related to a setting generated as a result of a setting process performed by a user for commanding an image forming unit to perform an image forming process;

outputting the stored setting-related information in accordance with an operation performed by the user; and together with the stored setting-related information, outputting another piece of the stored setting-related information as comparative setting-related information.

* * * * *